(12) United States Patent
Bjorkman et al.

(10) Patent No.: US 10,358,158 B2
(45) Date of Patent: Jul. 23, 2019

(54) MULTI-FUNCTION CONVERTIBLE TRAILER AND TOWING STRUCTURE

(71) Applicant: INTELLI-CORE LLC, Litchfield, MN (US)

(72) Inventors: Kyle Chas Bjorkman, Litchfield, MN (US); Jesse Richard Gamble, Burnsville, MN (US)

(73) Assignee: INTELLI-CORE LLC, Litchfield, MN (US)

( * ) Notice: Subject to any disclaimer, the term of this patent is extended or adjusted under 35 U.S.C. 154(b) by 0 days.

(21) Appl. No.: 16/185,361

(22) Filed: Nov. 9, 2018

(65) Prior Publication Data

US 2019/0071111 A1 Mar. 7, 2019

Related U.S. Application Data

(62) Division of application No. 15/418,897, filed on Jan. 30, 2017, now Pat. No. 10,155,529.

(60) Provisional application No. 62/289,203, filed on Jan. 30, 2016, provisional application No. 62/289,999, filed on Feb. 2, 2016.

(51) Int. Cl.
| | | |
|---|---|---|
| *B62B 19/04* | (2006.01) | |
| *B60D 1/167* | (2006.01) | |
| *B62D 21/20* | (2006.01) | |
| *B62D 63/06* | (2006.01) | |

(52) U.S. Cl.
CPC .......... *B62B 19/04* (2013.01); *B60D 1/1675* (2013.01); *B62D 21/20* (2013.01); *B62D 63/061* (2013.01)

(58) Field of Classification Search
CPC ...... B62B 19/04; B60D 1/1675; B60D 1/143; B60D 13/00; B60D 1/00; B60D 1/173; B60D 1/01; B60D 1/167; B62D 21/20; B62D 63/061; B62D 63/08
USPC ............ 280/7.14, 491.4, 491.2, 491.3, 491.1
See application file for complete search history.

(56) References Cited

U.S. PATENT DOCUMENTS

| | | | |
|---|---|---|---|
| 3,410,579 A | | 11/1968 | Jenson |
| 3,537,117 A | * | 11/1970 | Plesnevich .............. B63C 13/00 114/344 |
| 4,509,769 A | | 4/1985 | Weber |
| 5,088,754 A | | 2/1992 | Skelton |
| 7,290,774 B2 | * | 11/2007 | Despres .................. B62B 13/18 180/182 |
| 8,905,423 B2 | * | 12/2014 | Hart ...................... B62D 63/061 280/415.1 |
| 2002/0084123 A1 | * | 7/2002 | Farsdale ................... B60F 5/00 180/182 |

(Continued)

*Primary Examiner* — Paul N Dickson
*Assistant Examiner* — Hilary L Johns
(74) *Attorney, Agent, or Firm* — Westman, Champlin & Koehler, P.A.; Amanda M. Prose

(57) ABSTRACT

A trailer having a framework configured for selectively switching between a wheel-based towing mechanism and a ski-based towing mechanism and wherein the trailer framework is lightweight and configured for supporting an enclosed trailer that may be constructed of lightweight composite paneling. The trailer framework can also be used with a pivotable and removable tow-bar where the tow-bar is configured with a plurality of pivotable attachment points for pivotably securing to the framework. The tow-bar is also connectable to any tow-vehicle and can be removed from the tow-vehicle and the trailer framework when not in use, or can be pivoted upwardly about the trailer framework for storage.

8 Claims, 16 Drawing Sheets

(56) References Cited

U.S. PATENT DOCUMENTS

2011/0181006 A1* 7/2011 Heppner ................ B60G 11/04
  280/9
2014/0265174 A1* 9/2014 Rosenberger .......... A63C 5/044
  280/11.3
2014/0306425 A1* 10/2014 Atkinson ................ B60D 1/06
  280/414.5

* cited by examiner

MULTI-FUNCTION CONVERTIBLE TRAILER AND TOWING STRUCTURE

CROSS-REFERENCE TO RELATED APPLICATIONS

This application claims priority from U.S. non-provisional application Ser. No. 15/418,897, filed on Jan. 30, 2017 which claims priority from U.S. provisional application Ser. No. 62/289,203, filed on Jan. 30, 2016 and claims priority from U.S. provisional patent application Ser. No. 62/289,999, filed on Feb. 2, 2016, the contents of which are herein incorporated in their entities.

BACKGROUND

The present invention relates to trailers. More specifically, the invention relates to an enclosed convertible trailer for use in various activities or for use as a utility trailer and a towing structure that may be used with said trailer.

Generally, enclosed trailers are towed by vehicles such as trucks or vans. The trailers have a pair of wheels allowing for towing, however the wheels limit the ability of smaller vehicles, even light weight trucks, to tow an enclosed trailer or uneven, muddy or otherwise rough terrain.

Trailer frameworks also generally include an integral portion extending outwardly on one end that is configured for connection to the towing vehicle. When not in use, the towing end remains extending outwardly from the trailer and when in use, present a tripping or injury hazard to those walking near the trailer or the framework.

SUMMARY

An aspect of the present disclosure relates to a light weight convertible trailer framework, where the framework can support an open or an enclosed trailer. The framework is a wheeled framework for a trailer. The wheeled framework is further adapted with a plurality of skis such that the framework and thus the trailer supported thereon can be towed using either the wheels or the skis and the method of towing can be selected given the terrain conditions. The ski mode, when the trailer framework is towed by contact of the skis sliding over the ground can be used without requiring removal of the wheels. The wheels can be used for towing while the skis also remain connected to the framework (but not in contact with the ground surface). The enclosed trailer may be comprised of composite panels forming walls, a base and roof to further add to the light weight nature of the entire trailer.

The framework may be comprised of a plurality of metal tubes, such as aluminum. The tubing provides a framework for supporting a trailer enclosure thereon. At least one pair of wheels are operably attached to the framework, for example, on opposing sides of a distal end (opposite the towing attachment end) of the trailer. The wheels are operably attached to the framework via an axle, however this axle and/or the wheel connections may also be configured to rotate such that rotation of the axle and/or wheel connections raises or lowers the wheels with respect to their connection to the framework. Thus, rotation is converted to vertical movement of the wheels.

A bottom or ground facing surface of at least one section of the framework is adapted with at least one plate configured to contact the ground. The plate(s) may co-extend a portion of the length of the trailer away from the tow-connection end towards the wheels, however the plate(s), hereinafter referred to as a ski(s) are positioned secured to the framework and positioned between (inside) the pair of wheels so as not to inhibit use of the wheels. When the wheels are raised, the skis contact the ground and the trailer may be pulled by the skis. When the wheels are lowered, the skis are raised off of the ground and the trailer may be pulled by the wheels. The skis may be metal or plastic and may be coated with a material to reduce the coefficient of friction between the skis and the ground.

Another aspect of the present disclosure relates to a tow-bar that is pivotable between a stowed position and an in-use position, where the tow-bar is also easily removable from connection with the trailer framework and also from connection with the towing vehicle. The tow-bar is pivotably and removably connected at a plurality of spaced apart locations to a trailer framework. A first end of the tow-bar comprises at least two terminal ends of diverging arms where the terminal ends of these arms are configured to pivotably connect to the framework of the trailer. The second, opposing end of the tow bar comprises converging ends of the arms in an apex, where a connector for a tow vehicle is also positioned. This second end is configured for the tow-bar to be also removably attached at the second end via the vehicle connector to a tow vehicle.

The tow-bar further comprises a rigid member or arm extending from the first end to the second end of the tow-bar, where the rigid member may be positioned between the diverging arms. At a terminal end of the rigid member, which is positioned at the first end of the tow-bar, the terminal end of the rigid member can be configured to connection to the trailer framework and this connection may also be pivotable. An opposing first end of the rigid member meets the apex of the tow-bar arms at the second end and can be secured to the apex with a pin or clamp, thus providing stability to the tow-bar when the tow-bar is in the use position. The tow bar may pivot with the tow-bar as being connected to the second end of the tow bar to the stored position, or the rigid member may pivot independently of the tow-bar by only being connected to the framework and not secured to the tow-bar. The use position is a position where the tow-bar is concurrently connected to the tow-vehicle and the framework of the trailer, allowing for the trailer to be towed. The rigid member may then be secured to both the framework and the tow-bar itself for stability. In the stowed position, the tow-bar is connected only to the framework and is pivoted or rotated about the generally horizontal axis of the framework, such that, for example, the tow-bar is rotated upwardly and out of the way as it may be resting vertically against an trailer wall supported by the framework. The tow-bar can also be easily removed from both the framework and the tow vehicle and thus stored when not in use to prevent theft.

The tow-bar may be an aluminum or metal extrusion where components are welded or otherwise secured together and each of the pivotable connections, such as the pivotable attachment points at the first end may comprise pins for preventing or limiting the extent of the pivoting when the tow-bar is in use.

DETAILED DESCRIPTION

Figure 1:
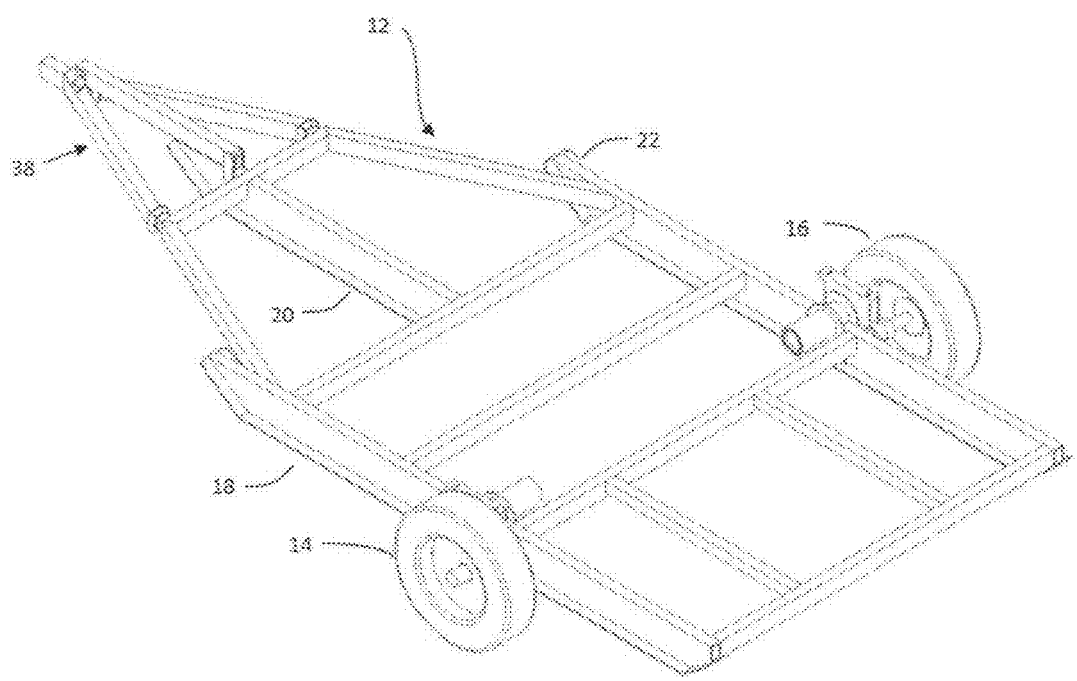
FIG. 1 is a perspective view of a framework and running gear of a convertible trailer according the present disclosure.
Figure 2:
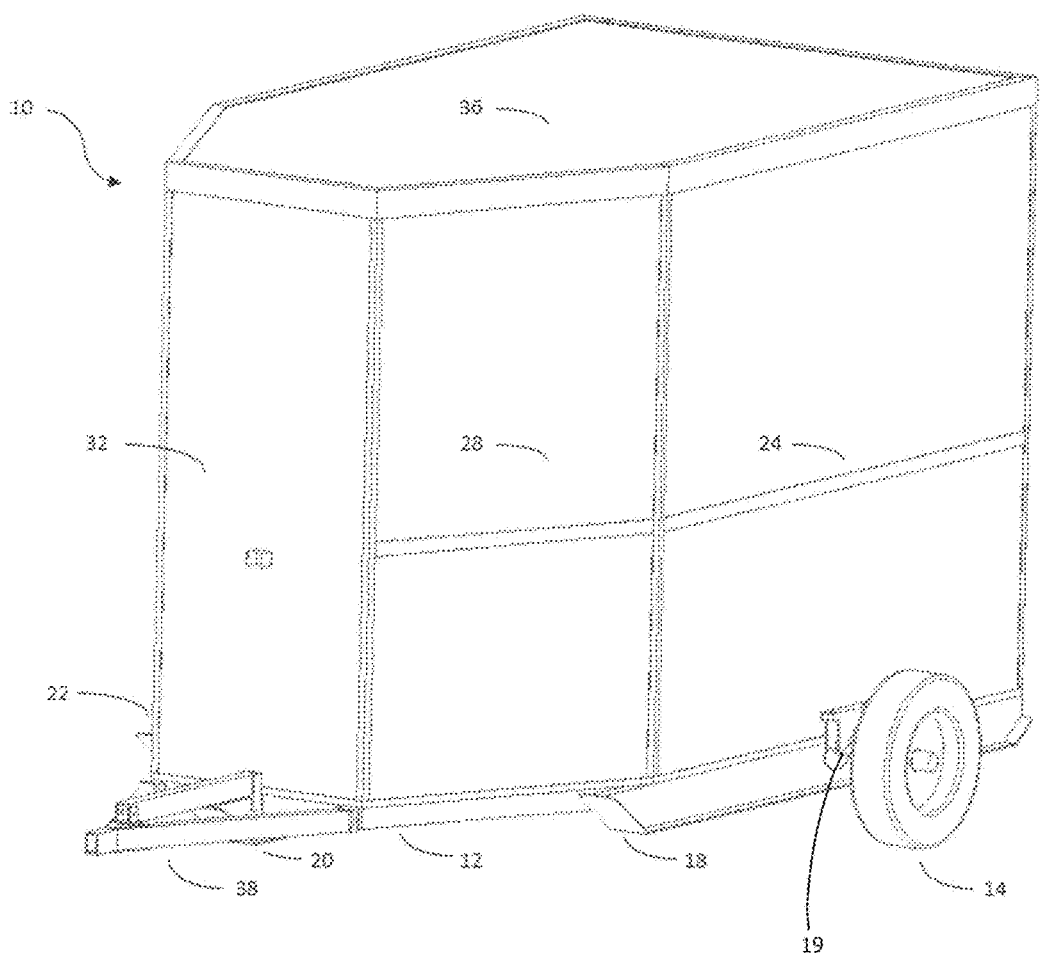
FIG. 2 is a perspective view of the convertible trailer in a "wheel mode."

A convertible trailer is described herein and comprises a framework having integrated skis that also accepts tire, wheel, and axle assemblies such that the trailer is configured for dual towing modes, selectable based on changing environmental conditions. The trailer is a convertible trailer that can be towed in a "wheel mode" or "a ski mode" as described herein.

Also described is a tow-bar assembly for coupling the framework of a tow vehicle, wherein the tow-bar assembly is convertible between rigid and pivoting configurations.

The tow-bar assembly includes a tow-bar attached to the trailer framework (and usable with any pre-existing trailer) at two or more points that lie upon the same axis which allow for free rotation of the tow-bar while the tow-bar is in a pivoting configuration. Thus, this forms a trailer which behaves similar in fashion to a sled, which greatly reduces the hitch weight on the tow vehicle. The tow-bar also comprises a rigid member, such that when pinned in one or more attachment points between said tow-bar and trailer frame, the rigid member creates a rigid frame configuration, allowing the tow-bar and hitch to behave similar to a traditional trailer tongue.

The trailer described herein is a lightweight enclosed trailer that is designed for use in connection with activities such as ice fishing, hunting and camping. The trailer may also be used as an enclosed utility trailer for carrying cargo and other items such as motorcycles, ATV's or other equipment.

Referring to FIGS. 2-6, an enclosed multi-functioning trailer is illustrated at 10. The trailer includes a metal frame 12 with a pair of tire, wheel, and axle assemblies 14 and 16 secured thereto. The frame 12 supports opposing side walls 24 and 26, opposing "V" nose walls 28 and 30, front wall 32, and rear door 34 installed thereon to form the side structure of the trailer 10. A trailer roof 36 sits adhered atop walls 24, 26, 28, 30, 32, and 34 to enclose the trailer structure 10. A tow bar 38 may be connected to the front of the frame 12, which allows for towing in both wheel and ski mode.

The walls 24, 26, 28, 30, 32, 34 and/or roof 36 may be comprised of panels such as laminated composite panels. These panels are insulated and are also waterproof which prevents mold formation and rotting of the components. The panels are also lightweight and thus contribute to the overall lightweight nature of the trailer 10.

The use of lightweight materials for the walls and the framework tubing ensures the ability to tow the trailer with a vehicle such as an ATV, UTV, snowmobile, or the like. This is advantageous in that the trailer can be towed out on to ice for ice fishing with a lighter weight vehicle, or can more easily be brought camping. The inside of the trailer may also be equipped with many amenities including beds, stereo, interior lighting, TV, heater, etc. as the frame and wall and floor panels can support such goods. The trailer may also be outfitted with windows and vents by way of adapting the wall or ceiling panels with said windows or vents. The trailer may also be configured with a solid rear wall or a rear ramp door, openable to provide easy access to the interior of the enclosed trailer. The trailer is also available in a variety of lengths as the length of the framework tubing and the sizes of the walls is selectively variable.

Figure 9:
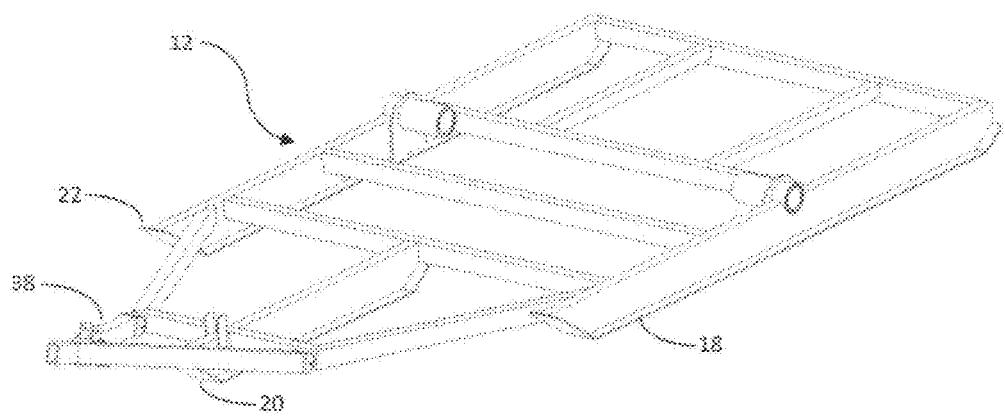
FIG. 9 is a perspective view of the convertible trailer framework with tire, wheel, and axle assemblies removed.
Figure 10:
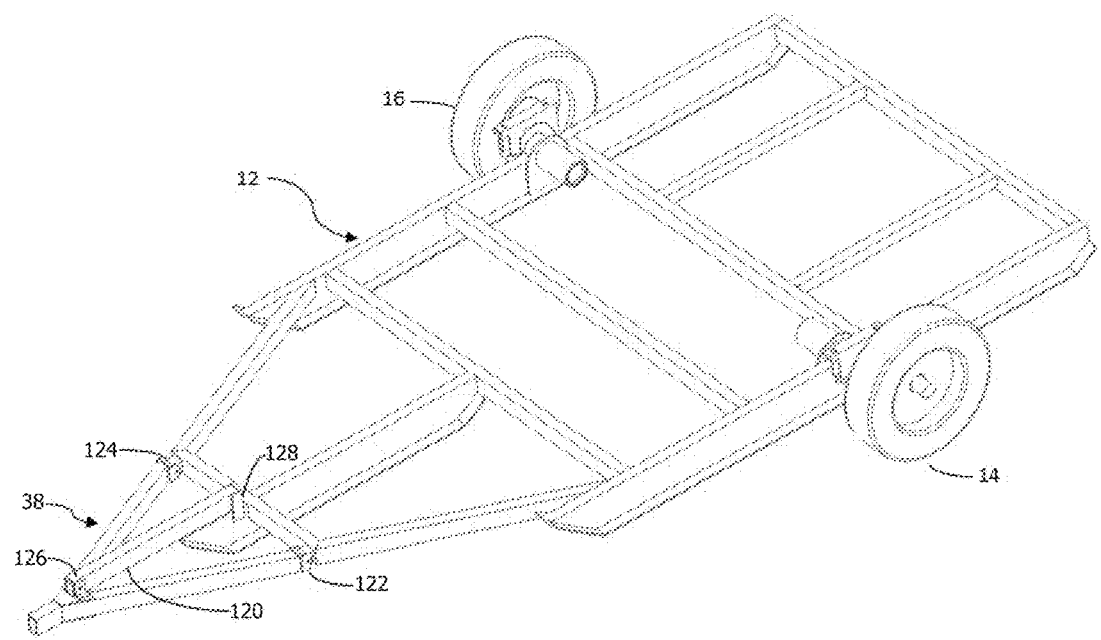
FIG. 10 is a perspective view of a tow-bar assembly and trailer framework in a rigid configuration.

FIGS. 1 and 9 of the drawings illustrate the frame 12 without the wall, roof, or floor structures for ease of illustration. The frame 12 is constructed from a plurality of tubular members. The frame 12 may be constructed of aluminum or like lightweight metal materials, steel tubular members, or a combination thereof. Three larger tubular members run from a front to a back of the trailer frame 12 and provide the initial structure needed to build in the integrated skis. These tubular members may be adapted to form the skis themselves, or skis may be integrally formed thereon or attached thereto. On the bottom side of these tubes, a metal (aluminum or steel for example) plate may be welded to these tubes to provide a larger contact surface with the ground which better distributes the trailer load and may provide angled front and rear edges to for a better angle of attack when towing in ski mode. It also contemplated that additionally or alternatively, a polymer or other non-metal material may be used to provide a low-friction wear surface to the bottom surface of the framework which contacts the ground and acts as a ski or otherwise the skis may be provided with a polymer or other non-metal bottom surface having a low coefficient of friction. Additionally, the skis may be comprised of replaceable ski runners and ski tips.

While three skis 18, 20, and 22 are illustrated, the trailer 10 may and framework 12 may be adapted with a varying number as skis depending on the configuration of the trailer. The trailer may comprise only 2 skis or may include 4 or more skis. This allows the skis to float up over the surface being travelled for smoother travel. A height of these tubes is greater than a remainder of the trailer frame 12 tubular members to provide ground clearance to the trailer during towing which reduces drag. The metal tubular sleeves used to mount the tire, wheel, and axle assemblies 14 and 16 can be seen in the trailer frame 12 and sleeves may be required for stub axles.

Figure 3:
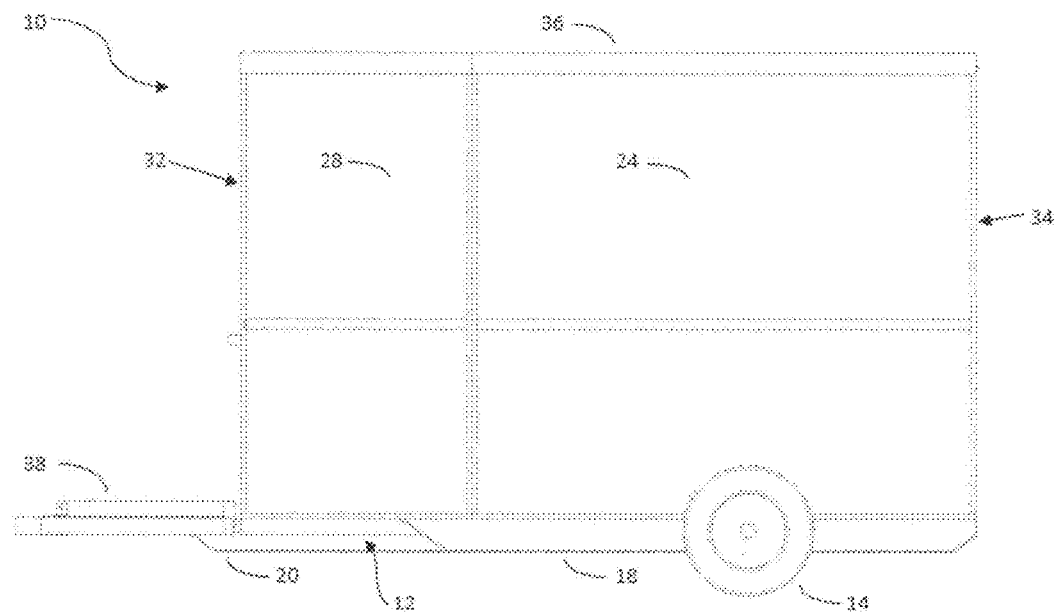
FIG. 3 is a left side view of the convertible trailer in wheel mode.

FIG. 3 is a side view of the trailer 10 while in wheel mode. It can be seen that the tire, wheel, and axle assembly 14 is in such a position that the tire is lower than the frame 12, giving ground clearance to allow for towing on the tires. The left (LH) and middle integrated skis 18 and 20 are attached to the frame 12 and do not require any modification or removal to operate the trailer 10 in wheel mode. A rotation mechanism 19 is operably connected to each wheel 16 and tire 14 such that the rotation mechanism moves the wheels themselves vertically (raises and lowers) the wheel when rotated. The rotation mechanism 19 is positioned on or near the axle and in operable connection with the wheel 16 to raise and lower the wheels 16. The rotation mechanism 19 is accessible for rotation as it is positioned between an outside wall of the trailer 10 and the wheel 16 and tire 14. When rotated, the mechanism raises (and conversely) lowers the wheels so that the ground clearance height of the frame 12 and thus the trailer 10 can be adjusted, for example, as called for the by ground surface or other conditions and can be rotated to such an extent that the wheels are lifted off of the ground, and secured by a locking mechanism above plane of the skis 18, 20, and 22 thus allowing the trailer to rest on the skis 18, 20, 22 for towing.

Figure 4:
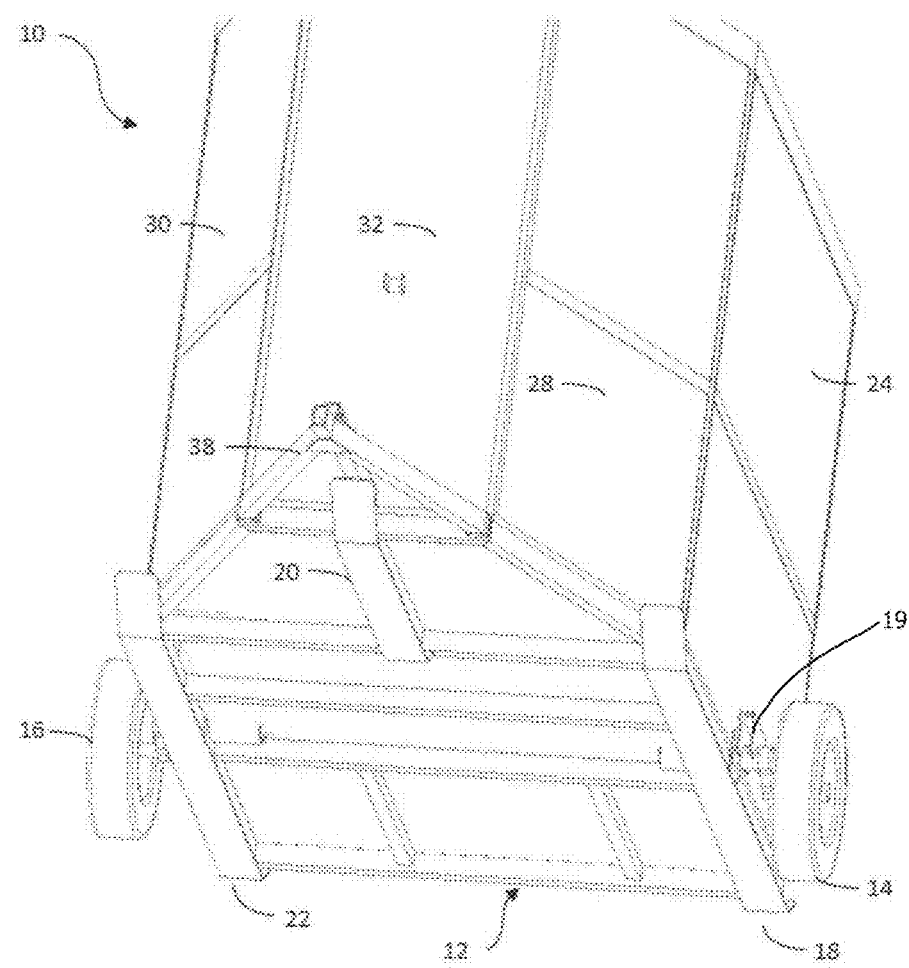
FIG. 4 is a perspective view of a bottom framework of the trailer having integrated skis.
Figure 5:
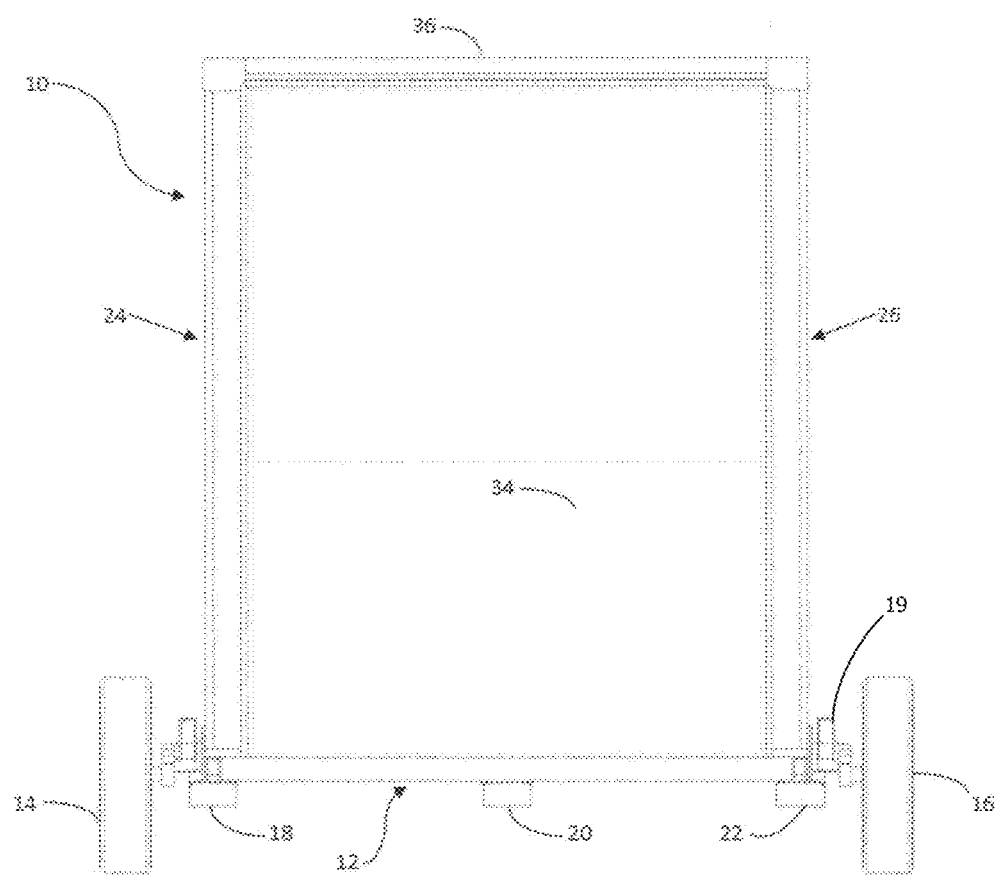
FIG. 5 is a rear view of convertible trailer.

FIGS. 4 and 5 also show the trailer 10 in wheel mode. The tire, wheel, and axle assemblies 14 and 16 mount in such a way that the tires are positioned outside of (wider than) the integrated skis 18, 20, and 22 allowing the tire to run freely with no interference from the skis 18, 20, and 22.

The skis 18, 20, and 22 can be integrated into the aluminum framework but may also be separate components that are bolted or otherwise fixably secured to the trailer structure. The skis may be made out of aluminum, steel, plastic, or any combination of these, or like materials. Towing the trailer by the use of skis is advantageous as it reduces the ground pressure of the trailer allowing it to be pulled more easily through deep snow, wet and heavy snow, or slush.

Figure 6:
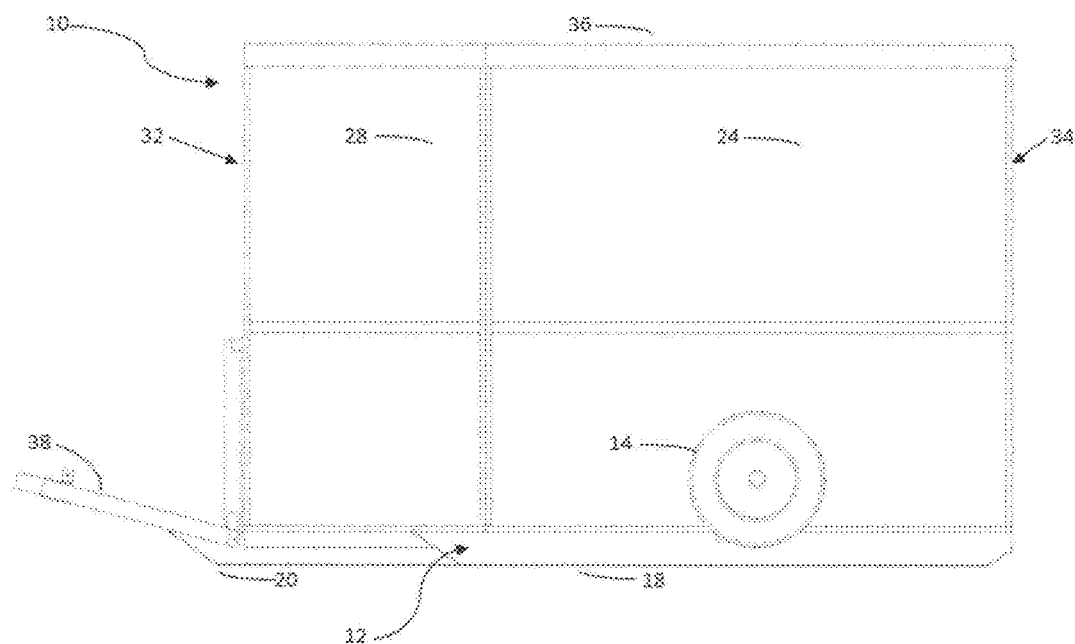
FIG. 6 is a left side view of the convertible trailer with axles rotated for ski mode.

FIG. 6 now shows the trailer 10 in ski mode. The tire, wheel, and axle assembly 14 has been rotated in such a way to raise the tires off of the ground which in effect lowers the trailer 10 down on to the frame 12. The trailer 10 is now resting on the skis 18, 20, and 22, which decreases the ground pressure and allows more flotation for the trailer 10 as it is towed. This reduces the drag of the trailer 10 and requires less pulling force to move. FIG. 6 also illustrates the ability to operate in skis mode while retaining the tire, wheel, and axle assembly 14 on the trailer 10. It is not required to remove the assembly 14 which makes for a quick and easy transition from wheel to ski mode (and vice versa). A tow-bar 38 has a removable pin which disengages a tubular member allowing the tow bar 38 to rotate freely at the pin mounts adjoining the tow bar 38 to the frame 12. This allows the trailer 10 to better float and adjust to undulating terrain while being towed in ski mode.

When skis 18, 20, and 22 are mounted to the trailer or otherwise integrated in to the trailer frame 12, this can be done so without preventing or inhibiting the ability to mount the tire, wheel, and axle assembly 14, 16 to the trailer frame 12. This allows the trailer 10 the ability to have both the ski and tire assemblies mounted to the trailer 10 at the same time. It is not required to change out one system for the other prior to using it. At any place and at any time, the change from wheel mode to ski mode or vice versa could be completed allowing for maximum flexibility based on weather conditions.

Figure 7:
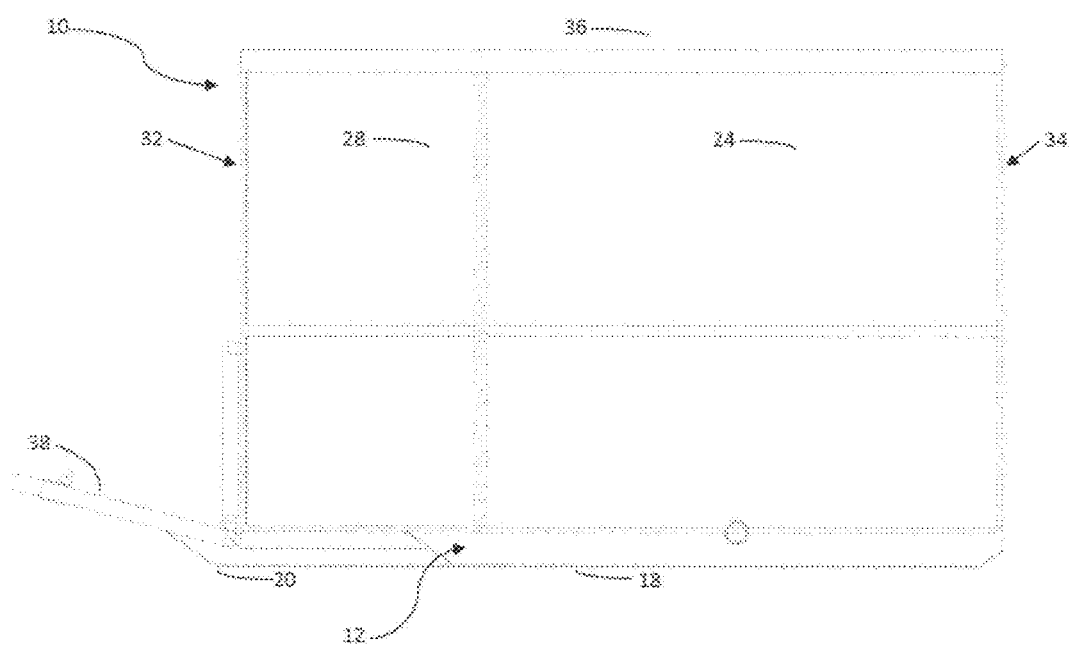
FIG. 7 is a left side view of the convertible trailer with axles removed for ski mode.
Figure 8:
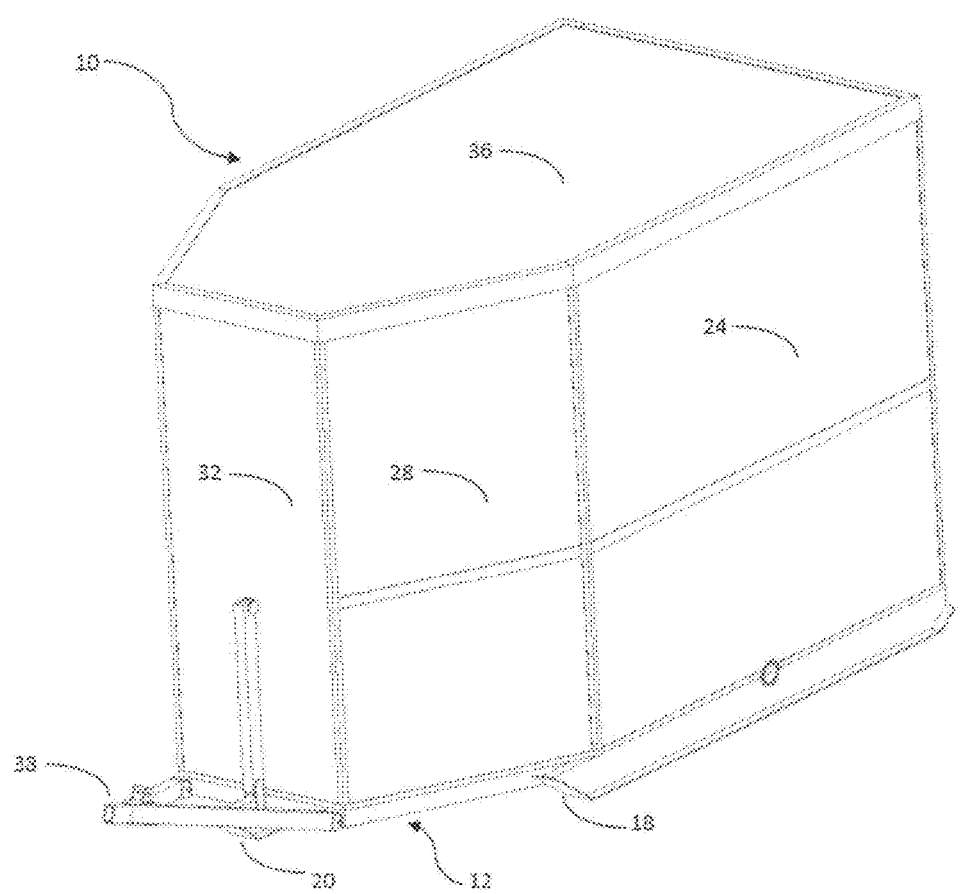
FIG. 8 is a perspective view of the convertible trailer in ski mode.

FIGS. 7 and 8 also show the trailer 10 in ski mode, but with the tire, wheel, and axle assemblies 14 and 16 removed. Such that while not required, the assemblies may be removable. The trailer 10 operates in the same manner as it would in any other configuration allowing for ski mode but with assemblies 14 and 16 removed, a significant percentage of the overall trailer's 10 weight is removed. This allows for reduced ground pressure, easier towing, and the ability to tow the trailer 10 in and to areas where it could otherwise not go (e.g., softer ground or less supporting ground surface such as ice).

Additionally, or alternatively, trailer 10 is configured for removal and/or rotation of the tire, wheel, and axle assembly 14 to allow for towing of the trailer on the integrated skis. To allow usage of either the tire mode or skis mode, the trailer axle assembly can be rotated to adjust the ground clearance of the trailer. At some point during the rotation, the tires raise up off of the ground allowing the trailer 10 to sit on the skis 18, 20, 22 to be towed in ski mode.

It is also possible that a permanently installed solid axle could be utilized instead of the stub tire, wheel, and axle assemblies 14 and 16 illustrated here. Since the solid axle is not easily removable, this assembly would remain always attached and installed on the trailer whether operating in ski or wheel mode.

Axle configurations include removable stub axles (two or more), permanent stub axles (two or more), or permanent full axles (one or more). The changes to the axle assembly type allows for the trailer 10 to have different amounts of ground clearance while in wheel mode and for different operating configurations while in ski mode. The removable stub axles allow for the tire, wheel, and axle assemblies 14, 16 to be simply removed from the trailer 10 to lower the weight of the trailer 10 while in ski mode. The axle assembly may rotate lowering the trailer framework to the ground which would then raise the tire off the ground allowing for the axle to be removed. Alternatively, the perimeter of the trailer 10 can be supported by jacks or another means raising the tires off the ground allowing the axle assembly to be removed. The jacks would then be lowered which would allow the trailer frame 12 to be set on the ground. Permanent stub or full axles allow the tire, wheel, and axle assemblies 14, 16 to rotate up and are fixed in a location where the tires are off the ground to allow for ski mode. Permanent axle designs do not require the removal of the sometimes heavy axle assemblies to operate in ski mode.

A wheel lifting mechanism is provided to raise and lower the wheels, thus allowing for the conversion between the wheeled mode and the ski mode for towing. As illustrated in the figures, an arm can be connected to the axle assembly for rotating the assembly to raise or lower the wheels. Examples of addition or alternative mechanisms for raising or lowering the wheels include, but are not limited to a winch may operably connected to the assembly for rotation for raising or lower wheels; an electric or hydraulic cylinder may be used to raise or lower the wheels. Supporting and lifting and lowering the trailer frame 12 may also be done by using independently mounted jacks or lifting mechanisms that remove pressure placed on the running gear, allowing for the running gear to be uncoupled from the frame and allow for the rotation of the running gear which would lower the frame. The trailer 10 can utilize independently rear mounted jacks that are configured to lift and lower the enclosure and the running gear can be unpinned and allowed to rotate freely which to allow the frame 12 to lower to the ground. The wheel lifting mechanism may also comprise a cable or strap winch.

It is also possible that the skis construction could be completed by utilizing wider frame tubular members which would eliminate the use of the additional plate to create a wider contact area. The skis may also be created by mechanically fastening or adhering additional metal or plastic components to the frame 12 to create the larger contact area. It is also an option to line the bottom of the metal skis with a plastic material such as HDPE or another material having a reduced coefficient of friction to provide a surface which reduces drag and to provide a wear surface which is easily replaced in order to maintain the integrity of the frame 12.

Referring now to the tow-bar 38 noted previously, the tow bar is illustrated in further detail in FIGS. 10-16. The tow-bar 38 is a convertible trailer towing tongue 38, hereafter referred to as "tow-bar" 38. The tow-bar 38 may attached to the frame 12 (and also attached to the frame of any type of pre-existing trailer such as an open, enclosed, utility, ice fishing, camping, or trailer of the like). The tow-bar 38 assembly is configured for coupling the trailer frame 12 to a tow vehicle. It is convertible between rigid and pivoting configurations.

In the rigid configuration, the assembly represents a standard tongue as would be found on the front of a road-going trailer frame. The tongue is supported both longitudinally and laterally with respect to the trailer frame 12. The rear attachment of the tow-bar 38 may be one or more points in such a configuration as to provide lateral stiffness. Longitudinal stiffness is provided by engaging a rigid member 120 between two or more points, where the rigid member engages at least one point attached to the trailer frame and at least one other point attached to the tow-bar 38. Thus, the tow-bar 38 may be attached to the frame 12 at two or more points, and for example, three points in total including the rigid member 120 connection as illustrated in the figures.

Figure 11:
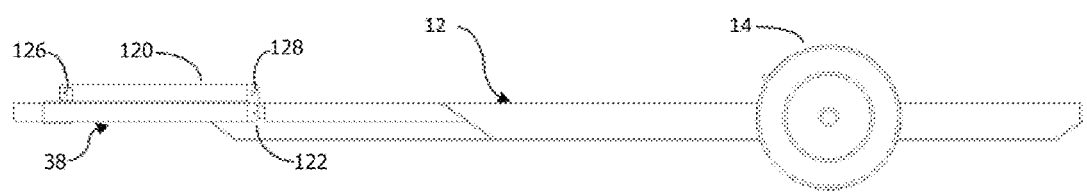
FIG. 11 is a side view of the tow-bar location relative the trailer framework while in the rigid configuration.

FIG. 11 illustrates a side view of the tow-bar 38 and trailer frame 12 in a rigid configuration. In this configuration, pins may be used in attachment points 122, 124, 126, and 128 to fix the tow-bar 38 in its location so that it is not allowed to pivot on attachment points 122 and 124. The plurality of attachment points that are pivotable include pin and bolt connections. For example, the tow-bar 28 is rotatably connected to the frame work and is configured to pivot or rotate about the attachment points while the rigid member 120 is also configured to rotate or pivot about its attachment point by way of rotation pins. Further, the rigid member can be secured to a bracket by the alignment of apertures in the member 120 and the bracket and the insertion of locking pins there through. Thus, as illustrated in the figures, the rigid member can be secured in a substantially horizontal position with the tow-bar or in a substantially vertical position, with or without the tow bar 38. The "bracket" may also be an integral part of the frame, and the secured storage position may be other than a substantially vertical position. The tow-bar 38 may have a storage position that is substantially upwardly such that the tow-bar 38 does not interfere with frame 12 during normal motion or so similarly, the rigid member 120 does not interfere with the tow-bar 38. For example, in instances where a fuel tank is mounted up front of the trailer 10, the storage position has the rigid member 120 at about 34° upwardly from horizontal position.

Figure 12:
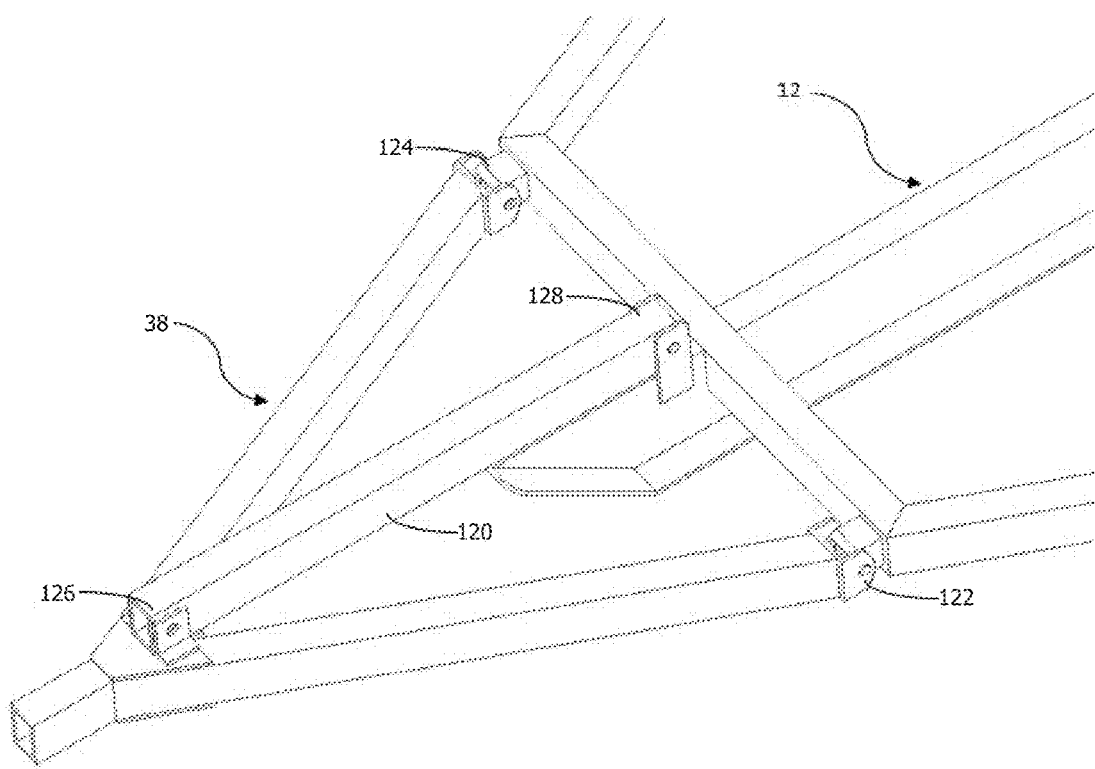
FIG. 12 is a perspective view of the tow bar assembly in the rigid configuration.
Figure 16:
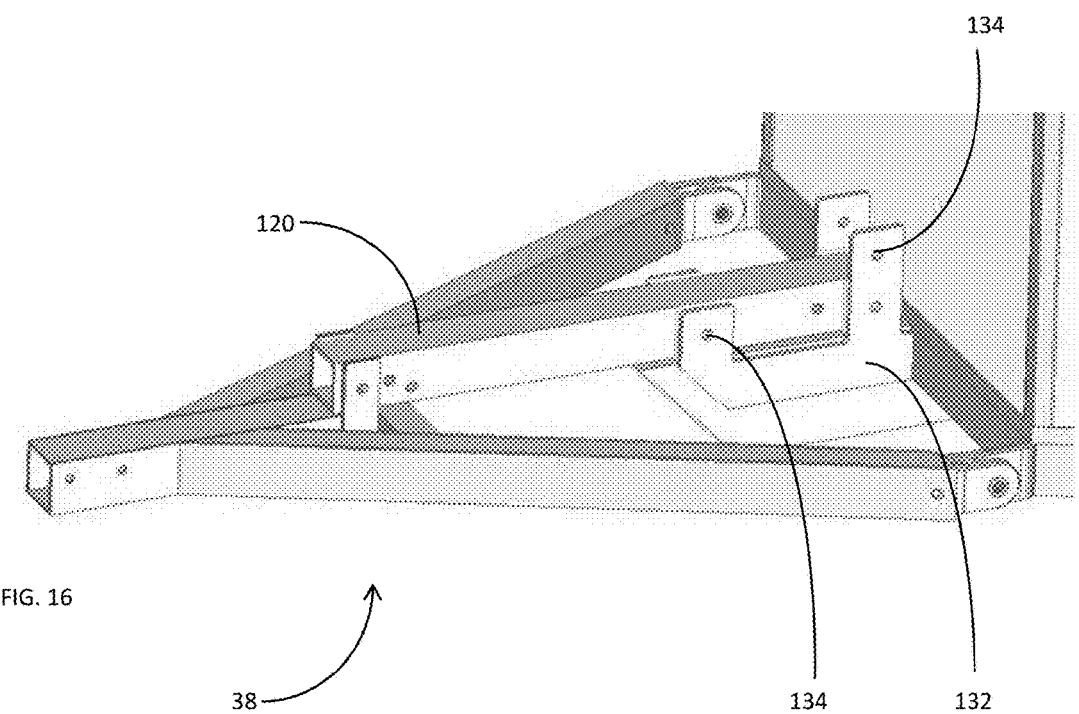
FIG. 16 is a perspective view of an additional tow-bar assembly and trailer framework in a rigid configuration.

In FIGS. 12 and 16, close-up views of the tow-bar 38 are presented. The tow-bar 38 is constructed from aluminum tubing and channels to form an A-frame type weldment where a center tube section running longitudinally is welded to two tubes which extend outward both laterally and longitudinally towards the trailer frame 12 (forming an "A" shape). The center tube section is used to mount the trailer coupler and is configured with a mechanism to removable attach to a standard mount on various vehicles. At the ends of the A-frame tubes, channel or a clevis may be secured to or welded to the tubes to provide a mounting location at the pivot attachment points 122 and 124. Thus, one or more vertically oriented tabs having an aperture therein for receiving a pin to there through to provide the pivot axis may be provided.

The trailer frame 12 may then have parts secured to or welded to it to provide the mating attachment point for the tow-bar 38. The pivot attachment points 122 and 124 are designed and installed in such a way that they are on the same axis to allow the tow-bar 38 to rotate freely upon the axis created by these points. A rigid member 120 has two or more attachment points. A front rigid member attachment point 126 connects the rigid member to the tow-bar 38. A rear rigid member attachment point 128 connects the rigid member to the trailer frame 12. Additional attachment points could be used to further attach the rigid member 120 to either the trailer frame 12 or the tow-bar 38 or both. The attachment points could use either pins or bolts with nuts for fastening. As illustrated in FIG. 16, a bracket 132 is secured to the frame 12 and is configured to provide a pivotable connection for the rigid member 120 and to provide one or more locking points for the rigid member. The pivoting connection or attachment of the rigid member 120 to the frame 12 via the bracket 134 comprising a pivot pin or bolt securing these components. Locking points 134 are pairs of opposing apertures that align with pairs of opposing apertures on the rigid member 120 to receive a locking pin. When the locking pin is inserted into the aligned pairs, the rigid member 120 can be secured to the tow-bar 38 (and thus in a position parallel to the tow-bar 38) and/or can be secured in a vertical position such that the rigid member 120 and/or the tow-bar are rotated upwardly. The rigid member 120 is configured to rotate with the tow-bar 38 and also to rotate independently of the tow-bar 38. Other pivoting configurations for connecting the tow-bar 38 and the rigid member 120 to the frame 12 are contemplated and include attachment points utilizing pivot pins for connecting flanges or elements of the two-bar to the frame 12.

In the pivoting configuration, the assembly represents a tow-bar as would be found between a utility sled and a tow vehicle. The tow vehicle could be a car, truck, ATV, UTV, snowmobile, or the like. In this pivoting configuration the tow-bar 38 is also providing lateral stiffness as in the rigid configuration. However, the tow-bar 38 is allowed to pivot up and down with respect to the plane represented by the trailer frame 12, through an axis lateral to the trailer frame 12. This may be accomplished by designing the attachment points between the tow-bar 38 and the trailer frame 12 such that they can pivot along this lateral axis. The front towing point connection to the tow vehicle can be made with any common style of trailer hitch connection. In this pivoting configuration, the trailer frame 12 could be supported over the ground by skis 18, 20, 22, and follow the ground. Thus, the pivoting nature of the tow-bar 38 allows the trailer to behave as a sled and not substantially require "tongue weight" to be carried on the hitch of the tow vehicle.

The tow-bar 38 is configured with an easy means of pivoting up and out of the way when not in service. This may be accomplished by uncoupling the attachment point(s) of the rigid member and pivoting the rigid member into a vertical or substantially upwards stowing position. The tow-bar 38 may also then be pivoted into a vertical or substantially upwards stowing position. The rigid member 120 and tow-bar 38 can pivot independently or together to the stowing position. The rigid member 120 and tow-bar may be retained in such a position through the use of pin(s), a padlock, strap, latch, magnets, or the like. By allowing the rigid member 120 and tow-bar 38 to be stowed in a substantially vertical position or upwards, it keeps the tow-bar 38 and the rigid member 120 out of the snow, ice, water, mud, or other elements present on the ground.

Figure 13:
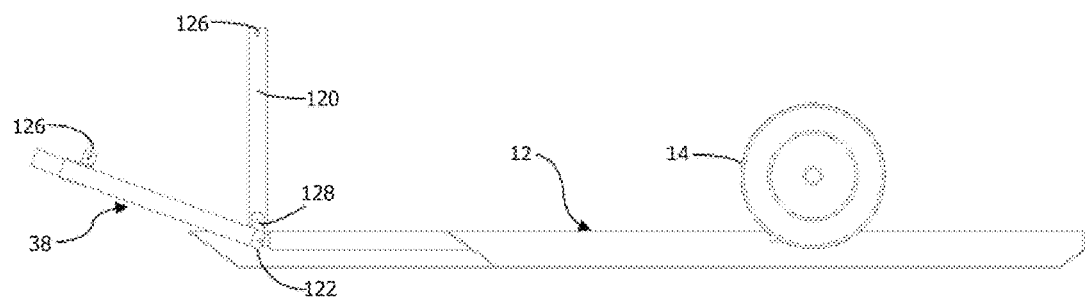
FIG. 13 is a side view of the tow-bar location relative the trailer framework while in the pivoting configuration.
Figure 14:
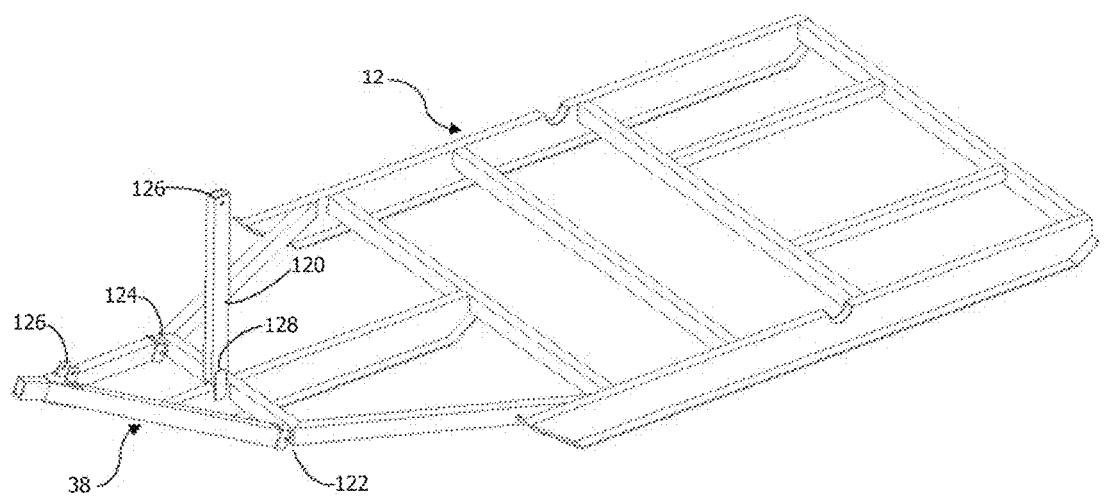
FIG. 14 is a perspective view of the tow-bar assembly and trailer framework in the pivoting configuration.
Figure 15:
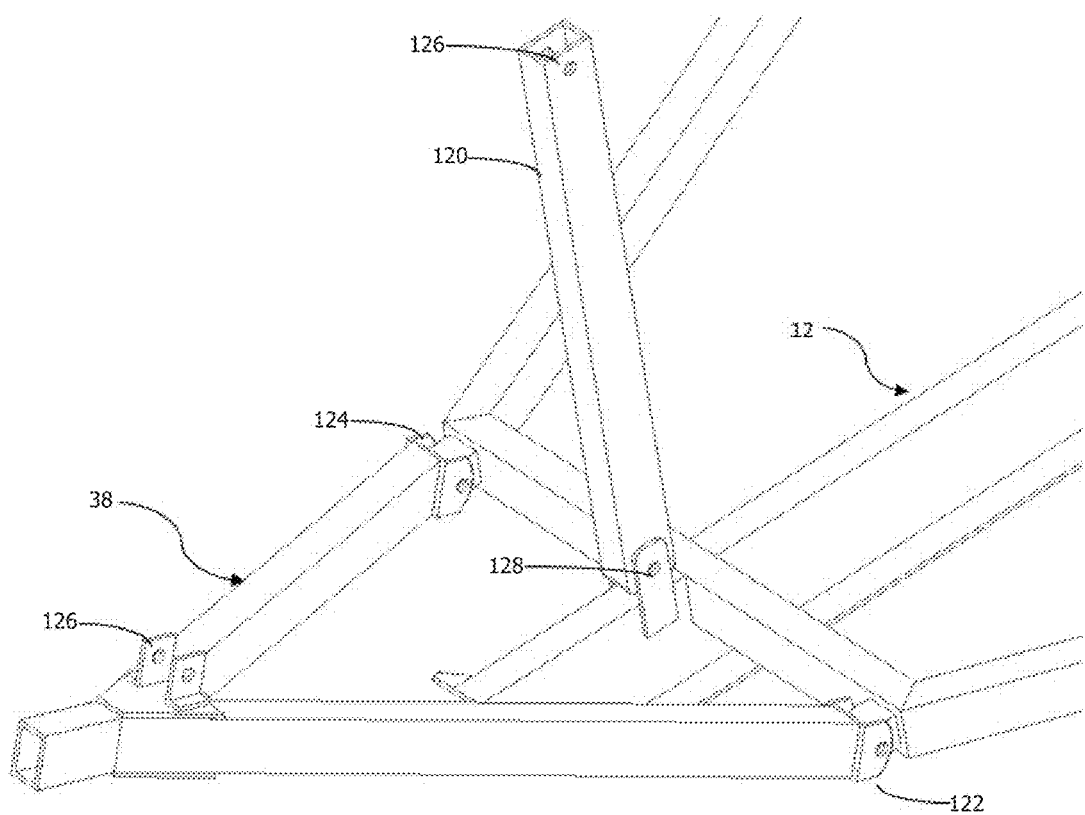
FIG. 15 is a perspective view of the tow-bar assembly in the pivoting configuration.

FIGS. 13-15 illustrate the tow-bar 38 in a pivoting configuration. It can be seen that rigid member 120 is rotated upwards and is decoupled from the tow-bar 38 at attachment point 126. The rigid member 120 is adapted with a pair of opposing apertures on each of the terminal ends of the rigid member 120. As illustrated in FIG. 15, the tow-bar 38 has upwardly extending prongs also having a pair of opposing apertures such that one terminal end of the rigid member can be positioned between the prongs on the tow-bar 38 such that the pairs of opposing apertures on the rigid member 120 and the tow-bar 38 are aligned and a pin can be inserted therethrough which secured the rigid member 120 to the tow-bar 38. Removal of the pin would allow for the pivoting of the rigid member 120 upwardly and way from the tow-bar 38 about a similarly constructed pivotable connection with the framework as pins can be inserted into the aligned opposing apertures of the attachment points on the tow-bar 120 and the trailer framework 12 to pivotably connect the tow-bar 12 to the framework 38.

The rigid member 120 could then have a secondary attachment point that would hold it in the upwards position to allow the tow-bar 38 to rotate freely at attachment points 122 and 124. This could be accomplished by using a pin or bolt in a secondary mounting bracket or by using a cable or other similar means to hold the rigid member 120 in its upward position. With the rigid member 120 decoupled from the tow-bar 38, the tow-bar 38 is allowed to rotate on attachment points 122 and 124 which create a single axis of rotation. The figures illustrate the tow-bar 38 rotated upwards so that the top plane of the tow-bar 38 is not at the same orientation as the top plane of the trailer frame 12 but instead intersects it. In the pivoting configuration, the trailer frame 12 will rest on the ground which eliminates nearly all of the hitch weight on the tow vehicle.

The tow-bar 38 may also be configured for "tool-less conversion" between the rigid and pivoting modes. As such, the rigid member attachment point(s) between the frame 12 and tow-bar 38 may be connected through use of tool-less pin insertion. This provides some security against theft and conserves space around the trailer 10. The tool-less removal by way of pins at the pivoting attachment points and rigid member attachment points for securing the components can be easily removed for removal and storage of the tow-bar 38. Alternatively the pivot points could be bolted using traditional fasteners, and still require low effort to remove.

A clamp type attachment could also be used to connect the rigid member at its attachment point(s) such that the attachments can be removed without the use of additional tools but remain secure enough for towing the trailer 10. The rigid member 120 may be retained by a clamp method as an alternative or in combination with a pin or bolted method. In this design, the rigid member 120 would rest on both the trailer frame 12 and the tow-bar 38 and a clamp would come over the tow-bar and then be tightened to create the rigid configuration. Examples of pivotable attachment mechanisms for connecting the tow-bar 38 to the framework 12 and of connecting the rigid member 120 to the framework 12 include but are not limited to bolts, screws, pins, clamps, or a combination thereof such that the tow-bar is removably attachable to the framework and wherein bolts, screws, pins, clamps or a combination thereof can be used to prevent pivoting or limit pivoting of the tow-bar about the pivotable connection when in use.

The rigid member 120 may be positioned laterally or at a different angle in relation to the trailer frame 12 instead of longitudinally. This allows the rigid member 120 to again be retained at the attachment points by the use of pins or bolts or be attached through the use of clamps.

The tow-bar 38 may have an integral transverse cross member located near the trailer frame. The rigid member then locks between the cross member and the trailer frame to complete the rigid configuration. This allows the rigid member to again be retained at the attachment points by the use of pins or bolts or be attached through the use of clamps.

The tow-bar 38 may be constructed in such a fashion that the components used to create the tow-bar 38 may run longitudinally, only with no lateral extension in relation to the trailer frame. This creates more of an inline tow-bar 38.

The tow-bar 38 may be constructed in such a fashion that the components used to form the tow-bar 38 are oriented such that they extend both laterally and longitudinally and utilize what is commonly referred to as an A frame coupler. This would eliminate the requirement of a longitudinally running center component to mount the hitch coupler.

The tow-bar 38, while in the rigid configuration, may be positioned such that the top plane of the tow-bar 38 is not in the same orientation of the top plane of the trailer frame 12 but intersects it.

Although the present disclosure has been described with reference to preferred embodiments, workers skilled in the art will recognize that changes may be made in form and detail without departing from the spirit and scope of the disclosure.

The invention claimed is:

1. A towable trailer comprising:
   a trailer framework configured for supporting a trailer enclosure thereon,
   wherein framework comprises:
      a plurality of first tubular members positioned in a direction of travel and a plurality of second tubular cross members extending between and connecting at least two of the plurality of first tubular members;
      at least one pair of ground engaging wheels operably mounted thereon;
      at least one substantially smooth bottom surface integral to the framework and extending along at least a portion of the length of at least one of the plurality of first tubular members in a direction of travel and the bottom surface positioned within the space between wheels of the at least one pair of wheels;
   a wheel lift mechanism configured to adjust the position of the ground engaging wheels vertically with respect to the framework so as to raise and lower the wheels with respect to the ground; and
   wherein the towing mechanism is selectively interchangeable between a wheeled tow and a ski tow, such that the wheels are used for towing in a first position and when the wheels are raised above the first position, the trailer is configured to rest on the at least one substantially smooth bottom surface integral to the framework such that the bottom surface of the framework engages with a ground surface for towing the trailer in a ski mode.

2. The towable trailer of claim 1, wherein the frame work is constructed of aluminum tubing.

3. The towable trailer of claim 1, wherein the trailer enclosure is comprised of at least one of a plurality of vertical walls, a floor panel and a roof panel and wherein the panels are constructed of a lightweight composite material.

4. The towable trailer of claim 1, wherein the substantially smooth bottom surface comprises at least one ski having an upturned edge, and wherein the bottom surface of the framework comprises at least two skis positioned on opposing sides of the framework and oriented in the direction of travel of the trailer when towed.

5. The towable trailer of claim 4, wherein the skis are comprised of a plastic material, a metal material, or a combination thereof and comprise an upturned edge in the direction of travel to promote sliding during towing.

6. The towable trailer of claim 5, wherein the skis are coated with a material configured to reduce the coefficient of friction of the surface of the skis.

7. The towable trailer of claim 1, where the wheels are not removed when the trailer is towed in ski mode.

8. The towable trailer of claim 1, wherein the framework is further configured with a removable and selectively pivotable tow-bar configured for removable and pivotable attachment to the framework and removable connection to a tow vehicle, where the tow-bar can be rotated upwardly about connection to the framework for storage when not in use.

* * * * *